United States Patent [19]

Nilsson et al.

[11] Patent Number: 4,734,265

[45] Date of Patent: Mar. 29, 1988

[54] GAS GENERATOR FOR SAFETY BELT TIGHTENING EQUIPMENT OF A VEHICLE

[75] Inventors: Karl E. Nilsson, Ottobrunn; Rüdiger Lang, Munich; Wolfgang Buhl, Baldham, all of Fed. Rep. of Germany

[73] Assignee: Bayern Chemie Gesellschaft für Flugchemische Antrieb mit beschränkter Haftung, Fed. Rep. of Germany

[21] Appl. No.: 753,665

[22] Filed: Jul. 10, 1985

[30] Foreign Application Priority Data

Jul. 13, 1984 [DE] Fed. Rep. of Germany ....... 3425836

[51] Int. Cl.⁴ .................. G05D 16/00; B01J 1/00; B60R 21/26
[52] U.S. Cl. .................................. 422/165; 422/166; 422/49; 422/113; 422/122; 280/735; 280/736; 280/740; 280/741; 29/453; 29/511
[58] Field of Search ............... 422/165, 166, 305, 113, 422/122, 49; 280/735, 736, 740, 741; 29/453, 511

[56] References Cited

U.S. PATENT DOCUMENTS

| 3,649,045 | 3/1972 | Smith et al. | 422/165 X |
| 3,715,131 | 2/1973 | Hurley et al. | 422/166 X |
| 4,103,937 | 8/1978 | Wakefield | 29/511 X |
| 4,109,578 | 8/1978 | Goetz | 280/741 X |

FOREIGN PATENT DOCUMENTS 2460427 3/1976 Fed. Rep. of Germany.

Primary Examiner—Barry S. Richman
Assistant Examiner—Lynn M. Kummert
Attorney, Agent, or Firm—McGlew and Tuttle

[57] ABSTRACT

In a gas generator for a vehicle protection system having an outer jacket and an inner housing attached thereto through an edge union and consisting of an ignition carrier and a thin-walled propellant vessel, which inner housing together with a primer and a propellant charge forms a hermetically encapsulated separate structural unit, an edge lip of the ignition carrier bent radially inward over the collar type enlarged propellant vessel edge is provided, which, when the inner housing is installed in the outer jacket, is pressed axially against a stepped abutment surface of the outer jacket and is thereby held in tight press-fit engagement on the collar-like vessel edge. Due to this the gas generator has, in terms of manufacture, a very simple construction in the region of the ignition carrier attachment to the propellant vessel but yet is highly burstproof.

10 Claims, 2 Drawing Figures

GAS GENERATOR FOR SAFETY BELT TIGHTENING EQUIPMENT OF A VEHICLE

FIELD AND BACKGROUND OF THE INVENTION

The present invention relates in general to gas generators and in particular to a new and useful gas generator particularly for safety belt tightening equipment in a vehicle.

Such gas generators have an inner housing which is preassembled with a propellant charge and primer and inserted, as an independent unit, in a consumer side outer jacket. These units are being used in relatively small sizes for instance in motor vehicle construction as propellant gas generators for belt tighteners or as ignition gas generators for the solid propellant charge of an inflatable safety cusion. As such they must satisfy stringent safety requirements despite their low cost, weight saving construction. A special problem in this respect, in known gas generators of this kind is the attachment of the relatively thin walled propellant vessel on the ignition carrier. It must be attached with the propellant charge already filled in and must withstand the high hot gas internal pressure when in use. If for this attachment of the propellant vessel on the ignition carrier side a union is provided which is easy to produce by cold shaping in the manner of a sheet metal seam, it requires an additional reinforcement to obtain sufficient mechanical strength, for instance an additional welded or bonded seam made by the electron beam method for protection against the propellant charge contained in the vessel. This, however, involves, for such gas generators, a considerable extra expense for its production.

SUMMARY OF THE INVENTION

It is the object of the present invention to improve the gas generator of the above kind, so as to obtain a highly safe construction in a cost saving manner, without the propellant vessel requiring a mechanical, that is, bonded or welded attachment at the ignition carrier.

Accordingly an object of the present invention is to provide a gas generator particularly for vehicle safety equipment, which has a tubular outer jacket and a hermetically encapsulated inner housing inserted in the outer jacket for containing a propellant with a primer. The gas generator includes an ignition carrier secured against axial displacement to the outer jacket. The outer jacket has a stepped abutment surface formed as an inclined shoulder. The propellant housing or vessel is made of thin walled material and includes an open end with an outwardly extending vessel edge forming a collar. The ignition carrier includes a deformable lip which when pressed against the abutment surface bends around against the collar-like vessel edge. The ignition collar is thus held against and in engagement with the propellant vessel in the outer jacket.

With the gas generator according to the invention, manufacture is very substantially facilitated by the fact that, by mere axial pressing of the ignition carrier together with the propellant vessel against an abutment surface acting as a tool the edge lip of the ignition carrier is bent radially inward over the collar like propellant vessel edge, with the special feature that, after the installation of the ignition carrier and of the propellant vessel in the outer jacket, the attachment seam thus made is effectively protected against bursting open under pressure due to the forcible application of the edge lip against the abutment surface of the outer jacket even without an additional mechanical union. The gas generator design according to the invention, with its effectively secured attachment of the propellant vessel on the ignition carrier side despite extremely simple manufacture, is thus excellently suitable for a cost saving production especially in large quantities.

For exact fixation of the propellant vessel on the ignition carrier when making the attachment seam, and for radial reinforcement (stiffening) of the vessel end on the ignition carrier side, the ignition carrier is provided, in a further advantageous form of the invention, with an annular groove receiving the enlarged vessel edge, its radially outer groove sidewall forming the edge lip which is bent over the vessel edge. According to another feature of the invention, the edge union of the ignition carrier with the insertion side end section of the outer jacket is preferably formed so that in the installed state of the inner housing the edge lip of the ignition carrier is pressed against the abutment surface of the outer jacket, whereby the attachment seam between ignition carrier and propellant vessel is secured still more.

According to a still further feature of the invention, a ring seal cooperating with the inner wall of the vessel is appropriately arranged between an ignition carrier section engaging into the propellant vessel and a pedestal type section of the primer attached to the ignition carrier, the advantage of this is that it is easier to assemble the ignition carrier and the primer attached thereto with the propellant vessel, and that by the seal required anyway between primer and ignition carrier also a sealing of the attachment seam formed by the edge lip is brought about at the same time. With a view to an improved forcible enclosure of the inner housing in the outer jacket, especially in the region of the edge lip, it is advisable to arrange the inner housing to be close-fitting in a stepped inner bore of the outer jacket.

According to another, especially preferred aspect of the invention, the propellant vessel is supported by its outflow side end opposite the ignition carrier on another stepped abutment surface of the outer jacket, whereby the attachment seam between ignition carrier and propellant vessel is relieved of the separating forces generated under the action of the hot gas internal pressure, and thus the structural safety of the gas generator is considerably increased. According to another inventive feature the vessel bottom of the propellant vessel disposed at the outflow side vessel end opposite the ignition carrier is preferably arched inwardly, in order to protect the tear zone of the propellant vessel against damage during handling and installation of the inner housing preassembled as an independent unit. The tear zone of the propellant vessel is generally defined as a local wall thickness reduction in the central portion of the vessel bottom to form a first membrane which, when ruptured, forms an outflow opening for the expanding gases after the propellant has been ignited.

Lastly, by providing a perforated disc which is automatically set under prestress during assembly of the ignition carrier and the propellant vessel, it is assured in a simple manner that the solid propellant particles are not only retained during burnoff in the propellant chamber, but also are compacted to constant density until the gas generator is activated and are protected against abrasion caused by vibration.

Accordingly, another object of the invention is to provide a gas generator which is simple in design, rugged in construction and economical to manufacture.

Another object of the invention is to provide a method of manufacturing the gas generator.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings, one embodiment of the invention is shown wherein.

DESCRIPTION OF THE PREFERRED EMBODIMENT

Figure 1:
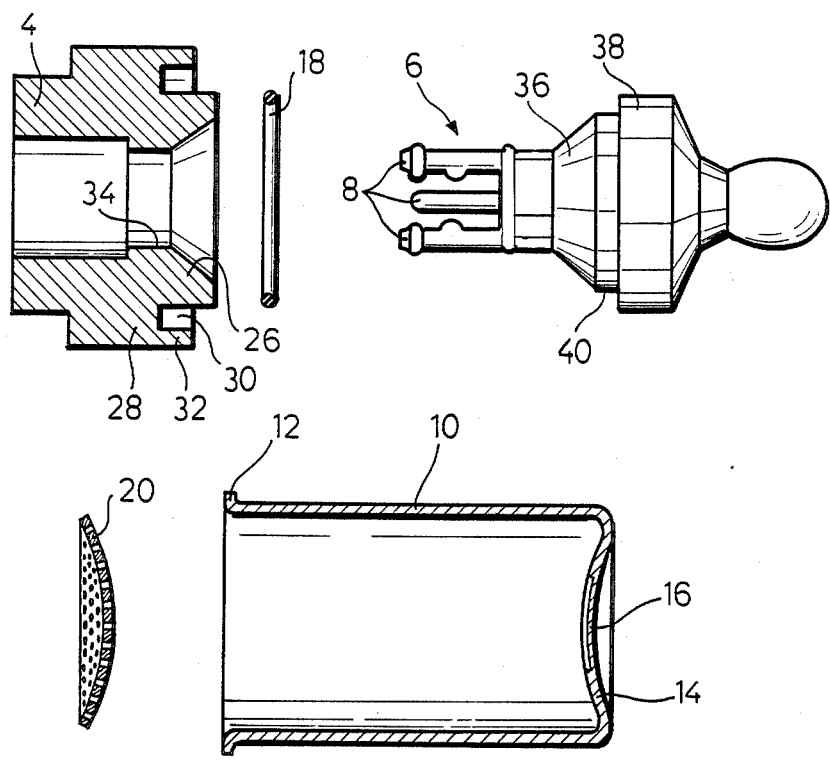
FIG. 1 is an exploded view which shows the separate parts of a gas generator, partly in section, before assembly.
Figure 1:
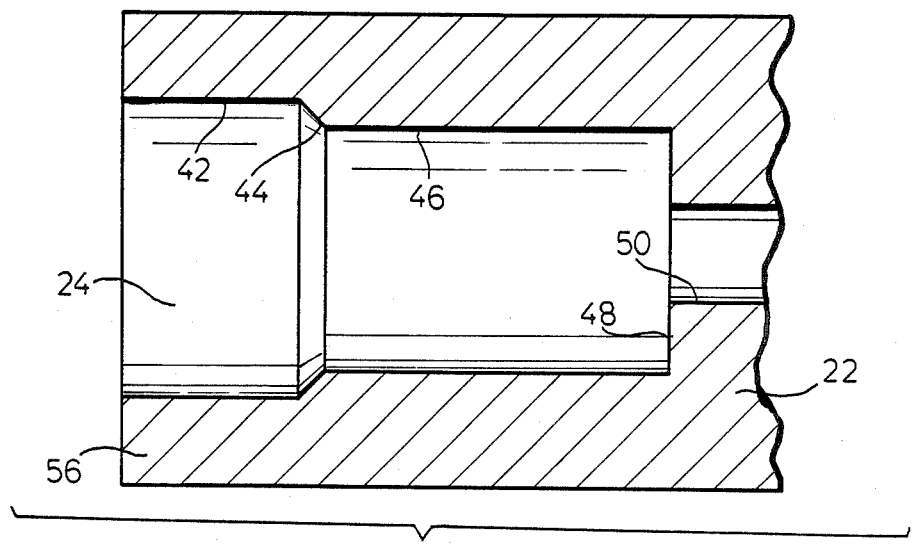

According to FIG. 1, the gas generator contains, as single elements, an annular ignition carrier 4 of metal, a pedestal shaped primer 6 with several electrical contact pins 8, a propellant vessel 10 formed as a thin walled, deep drawn metal bushing with a collar-like enlarged vessel edge 12 and with a bottom 14 concavely arched inwardly, whose central region 16 has a reduced wall thickness and tears open under the action of the hot gas internal pressure upon activation of the gas generator in the manner of a burst membrane, as well as an O-ring seal 18, an arched sieve disc 20, and a relatively thick walled tubular outer jacket 22 connected with the hot gas consumer (not shown), said outer jacket having a stepped internal bore 24. The assembled gas generator 2 is shown in FIG. 2.

The ignition carrier 4 is provided with an axially protruding ignition carrier section 26, whose diameter corresponds to the inside diameter of the prepellant vessel 10, and with a central enlarged shoulder 28, on the end face of which an annular groove 30 is formed which receives the collar-like vessel edge 12 and whose radially outer sidewall forms an axially protruding edge lip 32. Further the ignition carrier 4 contains a conically enlarged bore 34 into which the corresponding pedestal 36 of the primer 6 is inserted. The primer, too, is provided with an enlarged, close-fitting annular shoulder 38 to be inserted into the propellant vessel 10, which shoulder is contiguous to the conical ignition pedestal section 36 via a stepped annular shoulder 40 for the O-ring seal 18.

The inner bore 24 of the outer jacket 22 consists of a bore section 42, whose diameter is enlarged to the diameter of the ignition carrier shoulder 28 and which is located at the insertion end of the outer jacket 22, and of a central bore section 46 contiguous thereto by way of a stepped abutment surface 44 into which the propellant vessel 10 can be inserted with a close fit and which, by way of another stepped abutment surface 48, leads into a consumer side outflow opening 50 of reduced cross section.

Figure 2:
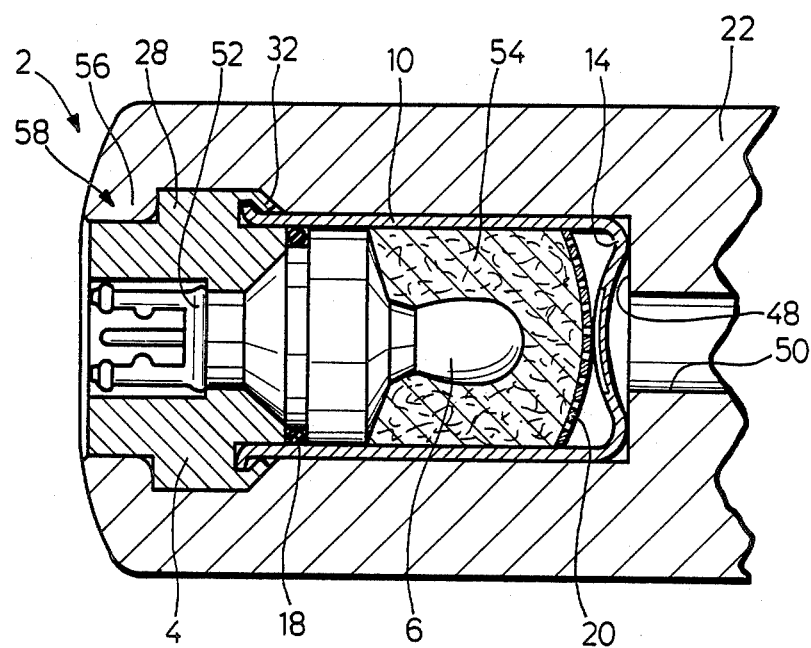
FIG. 2 is a sectional view of the gas generator in the fully assembled state.

To assemble the gas generator 2, first the ring seal 18 is placed on the shoulder type section 40 of primer 6 and the primer is forced into and secured in the receiving bore 34 of the ignition carrier 4 by the fact that the primer pedestal 36 is given a toroidal form, as indicated in FIG. 2 by the reference symbol 52. After insertion of the perforated disc 20 and after a proportioned propellant quantity 54 has been filled into the propellant vessel 10, the sub-assembly consisting of primer 6 and ignition carrier 4 is pushed into the open propellant vessel end until the enlarged edge 12 applies against the groove base of the annular groove 30, whereby the propellant powder 54 is compressed and disc 20, which applies against the inwardly arched vessel bottom 14 in the center, is set under prestress. In this position, the ignition carrier 4 and the propellant vessel 10 are jointly pressed axially against a conical tool surface corresponding to the abutment surface 44, so that the edge lip 32 is bent radially inward spanning the collar like vessel edge 12 with a close fit, and thus the propellant vessel 10 is connected with the ignition carrier 4 through a fastening seam produced by cold shaping. The inner housing, preassembled in this manner from the ignition carrier 4 and propellant vessel 10 including the parts 6, 18, 20 and the propellant filling 54, forms a hermetically encapsulated, light-weight, independent structural unit which can be handled as a whole separately from the outer jacket 22, for instance in transportation or storage, and which for final assembly of the gas generator 2 is inserted from the insertion end of the outer jacket 22 into the inner bore 24 thereof and is pressed on so firmly that the edge lip 32 is pressed against the collar like vessel edge 12 in axial direction by the conical abutment surface 44 and at the same time the vessel bottom 14 is brought in contact with the abutment surface 48. In this position, the ignition carrier 4 is secured on the outer jacket 22 by an edge union 58 produced for example by flanging the insertion side end 56 of the outer jacket 22 over the enlarged ignition carrier shoulder 28, whereupon, in the compressed state, even without external pressure, the fastening seam formed by the bent edge lip 32 remains in contact with the abutment surface 44 and the vessel remains in contact with surface 48 so that the gas generator 2 is completely assembled.

To make sure that the contact pins 8 of primer 6 are in a given angular position relative to the outer jacket 22, orientation points, such as lugs (not shown), may be provided between the primer 6 and ignition carrier 4 on the one hand and between the ignition carrier 4 and outer jacket 22, on the other.

While a specific embodiment of the invention has been shown and described in detail to illustrate the application of the principles of the invention, it will be understood that the invention may be embodied otherwise without departing from such principles.

What is claimed is:

1. A gas generator for a vehicle safety system, comprising a thick-walled tubular outer jacket defining a bore having an open end and at least a first stepped abutment surface, an annular ignition carrier secured against axial displacement in said outer jacket bore, said carrier having an edge lip engaged with said at least a first stepped abutment surface for fixing said carrier against axial movement in one direction of said outer jacket, said outer jacket having an edge union extending radially inwardly at said open end for retaining said carrier in said outer jacket against axial movement in an opposite direction, a primer connected to said carrier in said outer jacket bore and extending into a thin-walled propellant vessel which is also fastened to said ignition carrier and having an opening closed by said ignition carrier, said vessel containing propellant charge and having a vessel edge forming a collar engaged with said carrier adjacent said at least a first abutment surface of said outer jacket, said edge lip of said ignition carrier being engaged over said collar of said propellant vessel and being held in contact with said at least a first abutment surface of said outer jacket by said edge union, said ignition carrier including an annular groove for receiving said collar of said propellant vessel, said edge lip of said carrier forming a radially outer side wall of said annular groove.

2. A gas generator according to claim 1, including a ring seal engaged around a stepped shoulder of said primer and contained within said propellant vessel, said primer having a pedestal section and said ignition carrier having a bore with a side wall engaging said pedestal section.

3. A gas generator according to claim 1, wherein said ignition carrier has a larger outer diameter than said propellant vessel, said outer jacket bore having a larger diameter portion for receiving said ignition carrier and a smaller diameter portion for receiving said propellant vessel wherein said at least a first abutment surface is disposed therebetween.

4. A gas generator according to claim 1, wherein said outer jacket includes a second abutment surface in said bore spaced from said first abutment surface, said propellant vessel having a closed end opposite from said ignition carrier engaged against said second abutment surface.

5. A gas generator according to claim 4, wherein said closed end opposite from said ignition carrier, comprises a curved portion curving inwardly toward an interior of said propellant vessel.

6. A gas generator according to claim 5, including a perforated disc disposed at said closed end in said propellant vessel bearing against the propellant charge in said vessel, said perforated disc being prestressed against said propellant vessel closed end by force of said edge lip of said ignition carrier engaging against said collar of said vessel.

7. A gas generator particularly for a vehicle safety system comprising:
   an outer thick-walled jacket having an axially extending bore with at least a first inclined abutment surface therein;
   a thin-walled propellant vessel containing a propellant disposed in said bore, said propellant vessel having an open end with a radially outwardly extending collar edge and an opposite closed end;
   an ignition carrier engaged in said bore and having an edge lip inclined radially inwardly around said collar edge and being engaged against said at least a first inclined abutment surface of said outer jacket; and
   a pedestal primer connected to said ignition carrier and extending into said propellant vessel;
   said outer jacket having an edge union engagingly extending radially inwardly and against said ignition carrier on a side of said ignition carrier opposite from said propellant vessel for pressing said edge lip of said ignition carrier against said at least a first inclined abutment surface.

8. A gas generator according to claim 7 wherein said propellant vessel has a closed end which is curved concavely into an interior of said propellant vessel, a perforated screen in said propellant vessel engaged on one side with the propellant and on an opposite side against said curved end, said perforated screen being compressed and prestressed in said propellant vessel by force of said edge union of said outer jacket against said ignition carrier and primer.

9. A gas generator according to claim 8, including a ring seal engaged around a stepped shoulder of said primer and contained within said propellant vessel, said ignition carrier having an axial annular groove defined radially inwardly of said edge lip for receiving said collar edge of said propellant vessel.

10. A method of manufacturing a gas generator used particularly for a vehicle safety system which comprises an outer jacket defining a bore and having an open end and including an abutment surface in said bore, comprising filling a thin walled propellant vessel with a propellant charge, the vessel having an open end with an outwardly extending collar edge, connecting a pedestal primer to an ignition carrier which has an axially extending edge lip, engaging the collar edge of the propellant vessel in an annular groove disposed radially inwardly of the edge lip of the ignition carrier with the primer extending into the propellant vessel, deforming the edge lip radially inwardly and around the collar edge, inserting the combined ignition carrier with primer and propellant vessel into the bore of the outer jacket through the open end of the bore until the deformed edge lip of the ignition carrier engages against the abutment surface of the outer jacket bore, and deforming the outer jacket around the open end of the bore radially inwardly to press and hold the ignition carrier edge lip against the abutment surface.

* * * * *